United States Patent
Allen et al.

(10) Patent No.: US 7,401,139 B1
(45) Date of Patent: Jul. 15, 2008

(54) STORAGE AREA NETWORK MANAGEMENT AND CONFIGURATION METHOD AND APPARATUS VIA ENABLING IN-BAND COMMUNICATIONS

(75) Inventors: James Patrick Allen, Austin, TX (US); Duane Mark Baldwin, Kasson, MN (US); Gregory John Knight, Rochester, MN (US); Robert G. Kovacs, Austin, TX (US); David Lynn Merbach, Rochester, MN (US); William Roy Yonker, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 838 days.

(21) Appl. No.: 09/657,234

(22) Filed: Sep. 7, 2000

(51) Int. Cl.
*G06F 15/173* (2006.01)

(52) U.S. Cl. ...................... 709/224; 719/321

(58) Field of Classification Search ......... 709/220–230, 709/236–239, 202–219; 711/152, 163; 707/8, 707/9; 713/2; 719/312–329
See application file for complete search history.

(56) References Cited

U.S. PATENT DOCUMENTS

| | | | | |
|---|---|---|---|---|
| 6,163,824 A * | 12/2000 | Quackenbush et al. | ...... | 710/100 |
| 6,289,375 B1 * | 9/2001 | Knight et al. | ............... | 709/217 |
| 6,347,334 B1 * | 2/2002 | Fredericks et al. | .......... | 709/220 |
| 6,356,944 B1 * | 3/2002 | McCarty | ..................... | 709/222 |
| 6,389,432 B1 * | 5/2002 | Pothapragada et al. | ...... | 707/205 |
| 6,400,730 B1 * | 6/2002 | Latif et al. | ................... | 370/466 |
| 6,401,128 B1 * | 6/2002 | Stai et al. | .................... | 709/236 |
| 6,430,714 B1 * | 8/2002 | McAdam et al. | ............ | 714/704 |
| 6,460,113 B1 * | 10/2002 | Schubert et al. | ............. | 711/111 |
| 6,473,857 B1 * | 10/2002 | Panas et al. | .................... | 713/2 |
| 6,493,811 B1 * | 12/2002 | Blades et al. | ................ | 711/203 |
| 6,505,272 B1 * | 1/2003 | Bouvier et al. | .............. | 711/111 |

(Continued)

OTHER PUBLICATIONS www.t11.org, Dec. 13, 1999, T11/99-594v2 RTIN ELS for Topology Discovery Rev 1.2.*

(Continued)

*Primary Examiner*—Nathan J. Flynn
*Assistant Examiner*—David E England
(74) *Attorney, Agent, or Firm*—Joan Pennington

(57) ABSTRACT

A storage area network (SAN) management and configuration method and apparatus are provided via enabling in-band communications. In the storage area network (SAN) management and configuration method, a SAN management application is utilized for communicating with a device driver. A pass through is provided by the device driver to a host bus adapter (HBA) for passing communications to a device in the storage area network from the SAN management application. The storage area network (SAN) management and configuration apparatus via enabling in-band communications includes a storage area network (SAN) management application for communicating with at least one SAN-connected host system. Each SAN connected host system includes a management application agent for communicating with a host bus adapter (HBA) device driver. The HBA device driver is provided for communicating with a device in the storage area network. The HBA device driver includes at least one pass through service for passing a plurality of commands to the device in the storage area network. The management application agent provides predefined protocol functions for communicating with the device in the storage area network. The predefined protocol functions include a common transport (CT) protocol function and an extended link service (ELS) protocol function.

16 Claims, 3 Drawing Sheets

U.S. PATENT DOCUMENTS

| | | | | |
|---|---|---|---|---|
| 6,538,669 B1* | 3/2003 | Lagueux et al. | ............. | 715/764 |
| 6,557,060 B1* | 4/2003 | Haren | ......................... | 710/65 |
| 6,584,582 B1* | 6/2003 | O'Connor | .................... | 714/21 |
| 6,597,956 B1* | 7/2003 | Aziz et al. | ..................... | 700/3 |
| 6,606,630 B1* | 8/2003 | Gunlock | ..................... | 707/100 |
| 6,636,981 B1* | 10/2003 | Barnett et al. | .................. | 714/4 |
| 6,640,278 B1* | 10/2003 | Nolan et al. | .................... | 711/6 |
| 6,643,586 B2* | 11/2003 | Allen et al. | ................. | 701/213 |
| 6,643,748 B1* | 11/2003 | Wieland | ..................... | 711/152 |
| 6,665,714 B1* | 12/2003 | Blumenau et al. | ........... | 709/222 |
| 6,671,820 B1* | 12/2003 | Kelman | ......................... | 714/4 |
| 7,012,914 B2* | 3/2006 | Berman | ...................... | 370/351 |

OTHER PUBLICATIONS

O'Donnell, Jul. 21, 1999, McData Corporation, Requesting Topology information (RTIN) Extended Link Service For Topology Discovery Revision 2.0.*

Michael E. O'Donnell, Oct. 1999, McData Corporation, Requesting Topology information (RTIN) Proposal.* www.t11.org, Jun. 29, 1998, T11/98-264v1 ELS Proposal Rev. 1.1.*

* cited by examiner

STORAGE AREA NETWORK MANAGEMENT AND CONFIGURATION METHOD AND APPARATUS VIA ENABLING IN-BAND COMMUNICATIONS

FIELD OF THE INVENTION

The present invention relates generally to the data processing field, and more particularly, relates to a storage area network (SAN) management and configuration method and apparatus via enabling in-band communications.

DESCRIPTION OF THE RELATED ART

Some known storage area network arrangements, for example, in a serial storage architecture (SSA), device driver writers and host based adapter (HBA) vendors provide a complex set of micro code calls. A management program would then interrogate the HBA, using micro code calls specific to the particular HBA vendor and model, then interpret the results in a way that is specific to that particular HBA vendor and model.

One problem with this arrangement is that an in-depth understanding is needed for every HBA model of every vendor, which in the case of Fibre Channel, is impractical. There are too many vendors and too many models to implement this approach.

Another problem is that certain HBA models from certain vendors simply cannot support the necessary micro code calls to enable the devices to be managed, and thus prohibiting a SAN management program from working with these devices.

A need exists for a mechanism for communicating with devices in-band or over the fibre cable, allowing maximized flexibility, in a vendor and device independent manner.

SUMMARY OF THE INVENTION

A principal object of the present invention is to provide a storage area network (SAN) management and configuration method and apparatus via enabling in-band communications. Other important objects of the present invention are to provide such storage area network (SAN) management and configuration method and apparatus via enabling in-band communications substantially without negative effect and that overcome many of the disadvantages of prior art arrangements.

In brief, a method and apparatus are provided to enable in-band communications for storage area network (SAN) management and configuration. In the storage area network (SAN) management and configuration method, a SAN management application is utilized for communicating with a device driver. A pass through is provided by the device driver through a host bus adapter (HBA), for passing communications to a device in the storage area network from the SAN management application.

The apparatus for enabling in-band communications includes a storage area network (SAN) management application for communicating with at least one SAN-connected host system. Each SAN-connected host system includes a management application agent for communicating with a host bus adapter (HBA) device driver. The HBA device driver is provided for communicating with a device in the storage area network. The HBA device driver includes at least one pass through service for passing a plurality of commands to the device in the storage area network.

In accordance with features of the invention, the management application agent provides predefined, fibre channel standard, protocol functions for communicating with the device in the storage area network. The predefined protocol functions include a common transport (CT) protocol function and an extended link service (ELS) protocol function.

BRIEF DESCRIPTION OF THE DRAWINGS

The present invention together with the above and other objects and advantages may best be understood from the following detailed description of the preferred embodiments of the invention illustrated in the drawings, wherein.

DETAILED DESCRIPTION OF THE PREFERRED EMBODIMENTS

Figure 1:
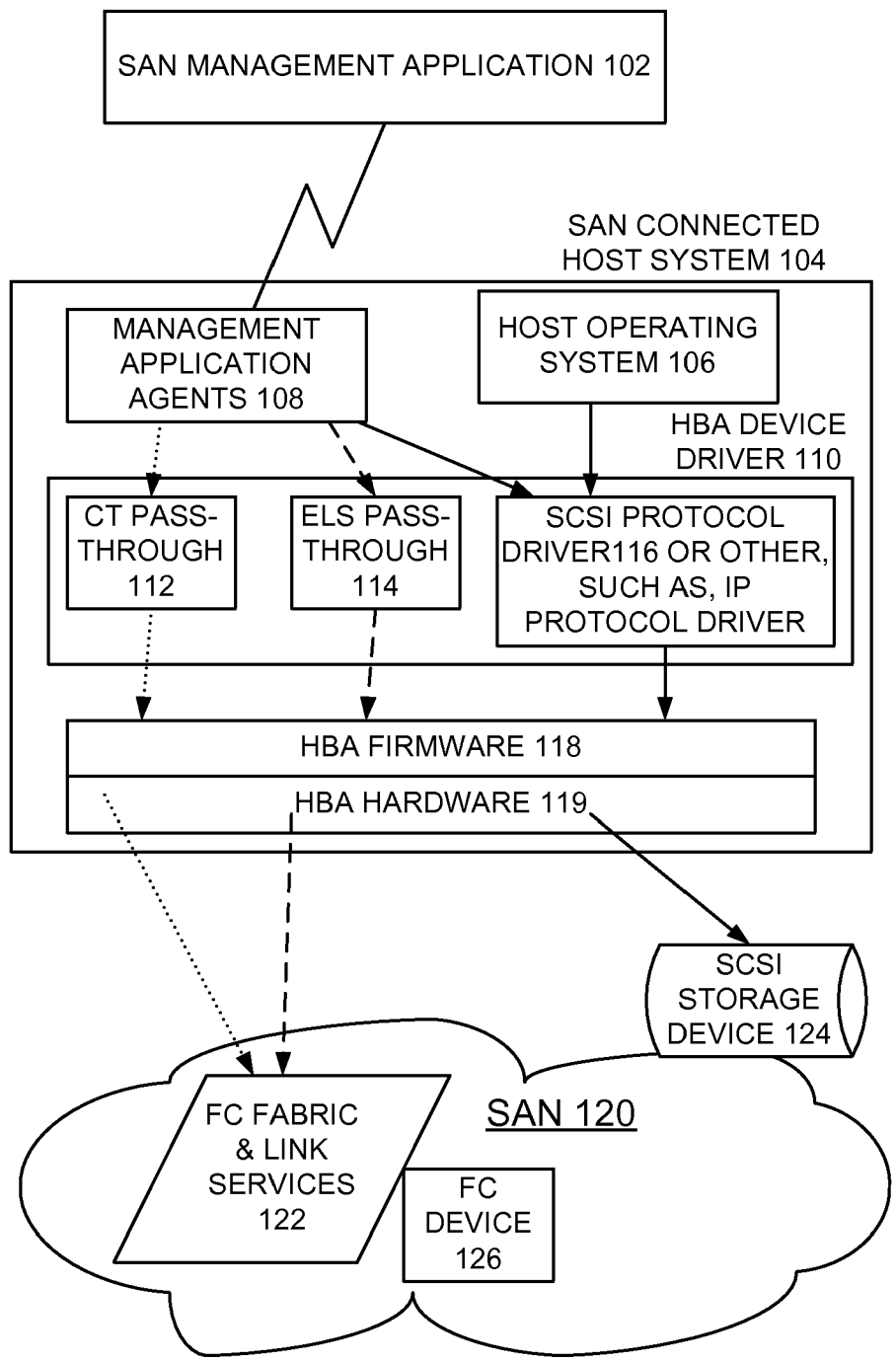
FIG. 1 is a block diagram representation illustrating a storage area network (SAN) system for implementing methods for enabling in-band communications in accordance with the preferred embodiment.

Having reference now to the drawings, in FIG. 1, there is shown a storage area network (SAN) system for implementing methods for enabling in-band communications in accordance with the preferred embodiment generally designated by the reference character 100. As shown in FIG. 1, SAN system 100 includes a SAN management application 102 coupled to a SAN connected host system 104 by a communications link 105. SAN connected host system 104 includes an operating system 106 and a management application agents 108 coupled to the SAN management application 102 and a host bus adapter (HBA) device driver 110. Typically SAN management application 102 is remotely coupled to multiple management application agents 108 on multiple SAN connected host systems 104.

HBA device driver 110 includes a common transport (CT) pass-through 112, an extended link service (ELS) pass-through 114 and a small computer system interface (SCSI) protocol driver 116. The CT pass-through 112 and the ELS pass-through 114 are coupled to the management application agents 108 that provides the CT protocol and ELS protocol communications functions. The SCSI protocol driver 116 is coupled to the host operating system 108 for conventional flow control of data. HBA firmware 118 and HBA hardware 119 is coupled between the HBA device driver 110 and a storage area network (SAN) 120. SAN 120 includes a fibre channel (FC) fabric and link services 122. The CT pass-through 112 and the ELS pass-through 114 are binary pass-throughs that each takes applied commands and passes the received commands to the SAN 120. CT operations from the management application agents 108 to the FC fabric and link services 122 are indicated by dotted lines. ELS operations from the management application agents 108 to the FC fabric and link services 122 are indicated by dashed lines. A SCSI storage device 124 is shown associated with the SAN cloud 120. FC fabric and link services 122 include multiple switches and hubs for connection of a plurality of FC devices 126 (one shown). FC fabric and link services 122 receive commands from the HBA firmware 118, HBA hardware 119 and sends data back via the HBA firmware 118, HBA hardware 119.

In accordance with features of the preferred embodiment, SAN management application 102 prepares a variety of commands at different levels of fibre channel specification, for example, CT and ELS commands. The SAN connected host system 104 communicates with the management application agents 108 which communicates with the HBA device driver 110 and HBA firmware 118, HBA hardware 119, which communicates with devices 126 in the SAN cloud 120.

In accordance with features of the preferred embodiment, in the SAN connected host system 104, the HBA device driver 110 and HBA firmware 118, HBA hardware 119 support the CT pass-through 112 and the ELS pass-through 114, such that a variety of commands, at different levels of the fibre channel specification, for example CT and ELS protocols, are prepared by the SAN management application agent 108, and passed via the HBA device driver 110 including the CT pass-through 112 and the ELS pass-through 114 and HBA firmware 118, HBA hardware 119 to a designated device where the commands are executed. As a result the problem of requiring micro code specific to multiple vendors is avoided. A reply can be generated on the device, and that reply returns to the SAN management program 102 via the same path of the commands.

In accordance with features of the preferred embodiment, the SAN connected host system 104 including the HBA device driver 110 and HBA firmware 118, HBA hardware 119 supporting the CT pass-through 112 and the ELS pass-through 114 allow several kinds of commands to be issued. For example, the commands include topology analysis commands, such as what is connected to what, and in what zone, and the like. The commands include performance analysis commands, such as access frame counters, data volume and the like. The commands include attribute analysis commands, such as disk drive number of blocks in use or free. The commands include configuration commands, such as to bring disks on or off line, swap spare disks, archive data, move disks between SAN zones, and the like.

Figure 2:
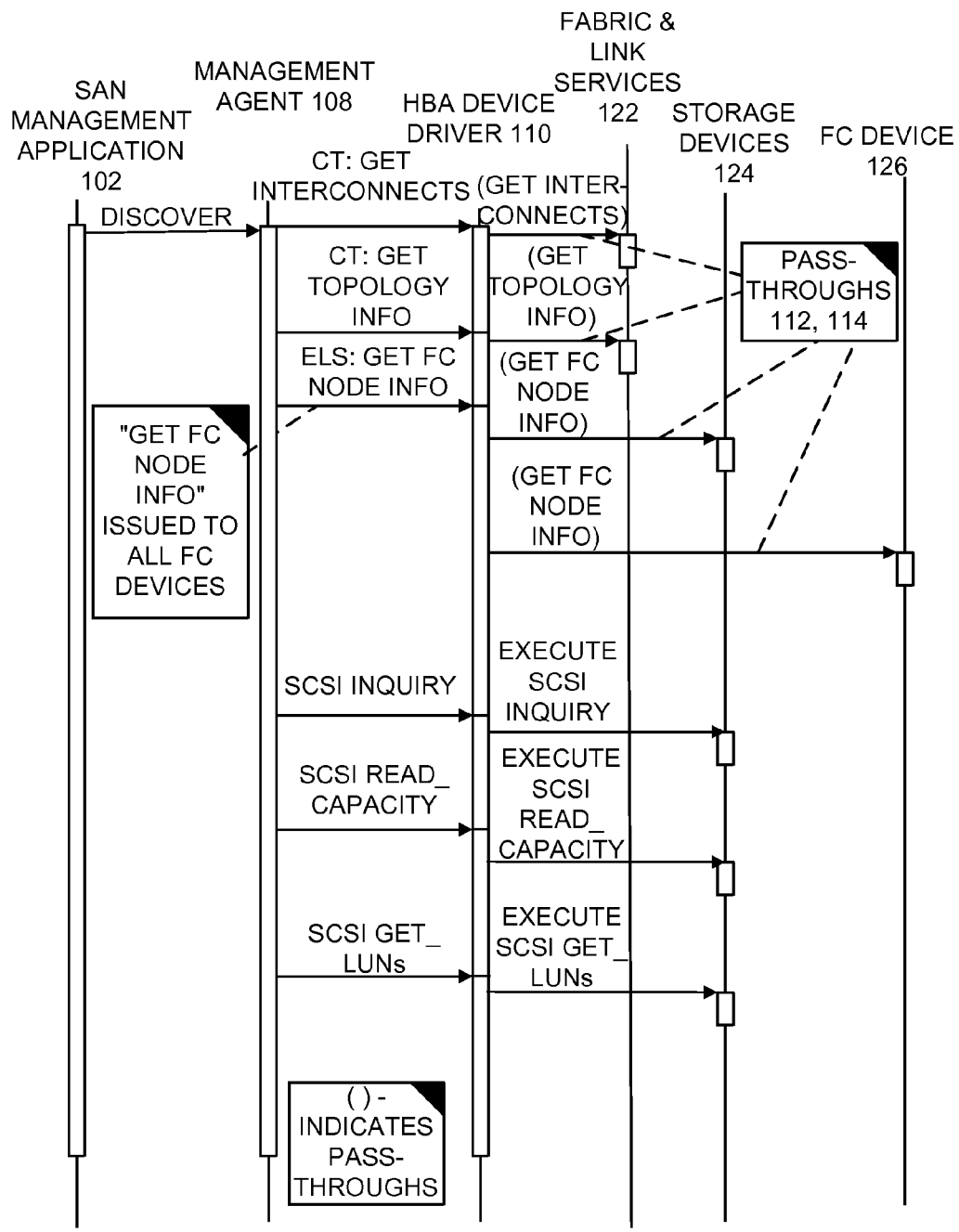
FIG. 2 is a sequence diagram illustrating exemplary logical sequential commands for discover using common transport (CT) and an extended link service (ELS) pass-through services in accordance with the preferred embodiment.

Referring now to FIG. 2, there is shown a logical sequence diagram illustrating SAN discover using the CT pass-through 112 and the ELS pass-through 114 services. SAN management program 102 issues a discover command to management agents 108 indicated at a line labeled DISCOVER. Management agents 108 issues commands to the HBA device driver 110 indicated at lines labeled CT: GET INTERCONNECTS; CT: GET TOPOLOGY INFO; ELS: GET FC NODE INFO; SCSI INQUIRY; SCSI READCAPACITY; and SCSI GETLUNs (get logical unit numbers). Via pass-throughs 114, 116 commands are issued to the fabric and link services 122 indicated at lines labeled (GET INTERCONNECTS); (GET TOPOLOGY INFO); the command (GET FC NODE INFO) is issued to the SCSI storage devices 124 and (GET FC NODE INFO) is issued to the FC device 126. SCSI commands are issued to the storage devices 124 indicated at lines labeled EXECUTE SCSI INQUIRY; EXECUTE SCSI READCAPACITY; and EXECUTE SCSI GETLUNs.

Figure 3:
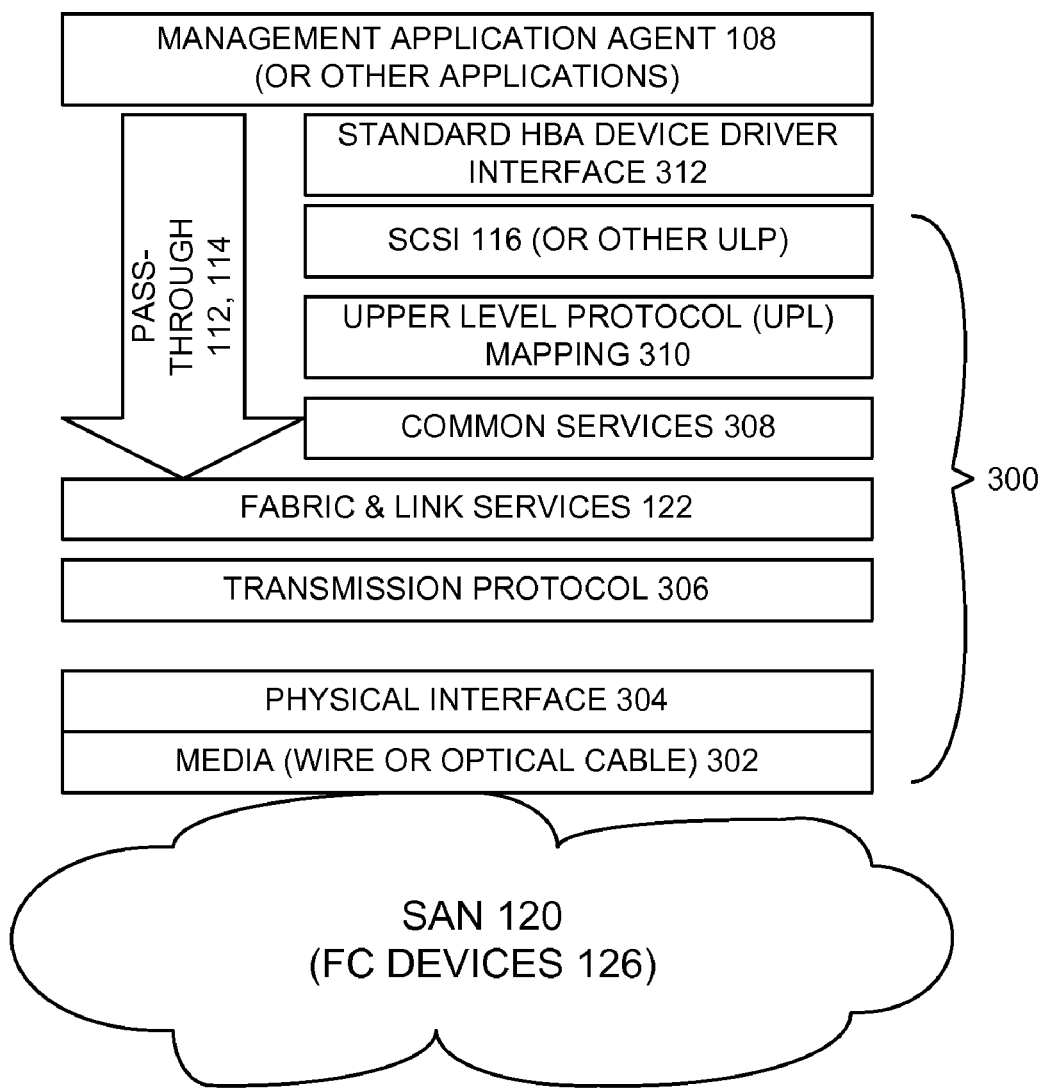
FIG. 3 is a diagram illustrating a storage area network (SAN), a fibre channel hierarchy and a management application agent together with the pass-through services in accordance with the preferred embodiment.

Referring now to FIG. 3, there is shown the storage area network (SAN) 120 with FC devices 126, a fibre channel hierarchy 300 and the management application agent 108 together with the pass-through services 112, 114 in accordance with the preferred embodiment. The fibre channel hierarchy 300 includes from a lower layer to a top layer, a media 302 or wire or optical cable layer coupled to the SAN 120, a physical interface 304, a transmission protocol 306, the fabric and line services 122, common services 308, an upper level protocol (UPL) mapping 310, and the SCSI protocol driver 116. A standard HBA device driver interface 310 is coupled to the SCSI protocol driver 116. The management application agent 108 is coupled to the standard HBA device driver interface 310 and the pass-through services 112, 114. As shown in FIG. 3, the pass-through services 112, 114 in accordance with the preferred embodiment allows bypassing of the standard HBA device driver interface 310 and the upper fibre channel layers including the SCSI protocol driver 116, the upper level protocol (UPL) mapping 310, and the common services 308. The pass-through services 112, 114 passes commands received from the management application agent 108 directly to the fabric and link services 122.

While the present invention has been described with reference to the details of the embodiments of the invention shown in the drawing, these details are not intended to limit the scope of the invention as claimed in the appended claims.

What is claimed is:

1. A storage area network (SAN) management and configuration method via enabling in-band communications comprising the steps of:
   utilizing a SAN management application for managing and configuring the storage area network; said SAN management application communicates with at least one SAN-connected host system and communicates with a host bus adapter (HBA) device driver, and
   providing a pass through in said HBA device driver for passing communications to a designated device in the storage area network from said SAN management application including at least one topology analysis command; said at least one topology analysis command including a command to get interconnect information and a command to get topology information; and providing said pass through includes providing at least a transport pass through and an extended link service (ELS) pass through; each of said transport pass through and said extended link service (ELS) pass through being a binary pass through, each taking applied commands and passing said commands to said designated device in the storage area network.

2. A storage area network (SAN) management and configuration method as recited in claim 1 wherein the step of utilizing said SAN management application for communicating with a HBA device driver includes the step of providing a management application agent coupled between said SAN management application and said HBA device driver.

3. A storage area network (SAN) management and configuration method as recited in claim 2 includes the step of utilizing said management application agent for providing predefined, fibre channel protocol functions for communicating with said device in the storage area network.

4. A storage area network (SAN) management and configuration method as recited in claim 3 wherein the step of providing predefined protocol functions for communicating with said device in the storage area network include the step of providing a transport protocol function and an extended link service (ELS) protocol function.

5. A storage area network (SAN) management and configuration method as recited in claim 1 wherein the step of providing said pass through in said host bus adapter (HBA) device driver for passing communications to a device in the storage area network from said SAN management application includes the step of providing said pass through for passing a plurality of commands.

6. A storage area network (SAN) management and configuration method as recited in claim 5 includes the step of providing said pass through for passing at least one performance analysis command.

7. A storage area network (SAN) management and configuration method as recited in claim 5 includes the step of providing said pass through for passing at least one attribute analysis command.

8. A storage area network (SAN) management and configuration method as recited in claim 5 includes the step of providing said pass through for passing at least one configuration command.

9. A storage area network (SAN) management and configuration apparatus via enabling in-band communications comprising:

a storage area network (SAN) management application for managing and configuring the storage area network; said SAN management application communicates with at least one SAN-connected host system;

said SAN-connected host system including a management application agent for communicating with a host bus adapter (HBA) device driver;

said HBA device driver for communicating with a designated device in the storage area network; said HBA device driver including at least one pass through service for passing a plurality of commands to said designated device in the storage area network; said commands including at least one topology analysis command; said at least one topology analysis command including a command to get interconnect information and a command to get topology information;

said at least one pass through including a transport pass through and an extended link service (ELS) pass through; each of said transport pass through and said extended link service (ELS) pass through being a binary pass through, each taking applied commands and passing said commands to the designated device in the storage area network.

10. A storage area network (SAN) management and configuration apparatus via enabling in-band communications as recited in claim 9 wherein SAN-connected host system includes a fibre channel hierarchy and a HBA device driver interface.

11. A storage area network (SAN) management and configuration apparatus via enabling in-band communications as recited in claim 10 wherein said at least one pass through service bypasses said HBA device driver interface and a plurality of layers of said fibre channel hierarchy.

12. A storage area network (SAN) management and configuration apparatus via enabling in-band communications as recited in claim 11 wherein said plurality of layers of said fibre channel hierarchy includes a small computer system interface (SCSI) protocol driver, an upper level protocol (UPL) mapping, and a common services layer.

13. A storage area network (SAN) management and configuration apparatus via enabling in-band communications as recited in claim 9 wherein said at least one pass through service for passing said plurality of commands to said designated device in the storage area network include at least one attribute analysis command.

14. A storage area network (SAN) management and configuration apparatus via enabling in-band communications as recited in claim 9 further includes at least one performance analysis command and at least one configuration command.

15. A storage area network (SAN) management and configuration apparatus via enabling in-band communications as recited in claim 9 wherein said management application agent provides predefined protocol functions for communicating with said designated device in the storage area network; said predefined protocol functions including a transport protocol function passed to said designated device by said transport pass through.

16. A storage area network (SAN) management and configuration apparatus via enabling in-band communications as recited in claim 9 wherein said management application agent provides predefined protocol functions for communicating with said designated device in the storage area network; said predefined protocol functions including an extended link service (ELS) protocol function passed to said designated device by said extended link service (ELS) pass through.

* * * * *